(12) United States Patent
Mundada

(10) Patent No.: US 11,714,789 B2
(45) Date of Patent: Aug. 1, 2023

(54) PERFORMING CROSS-DATASET FIELD INTEGRATION

(71) Applicant: Optum Technology, Inc., Eden Prairie, MN (US)

(72) Inventor: Deepak Ganeshlal Mundada, Hyderabad (IN)

(73) Assignee: Optum Technology, Inc., Eden Prairie, MN (US)

(*) Notice: Subject to any disclaimer, the term of this patent is extended or adjusted under 35 U.S.C. 154(b) by 528 days.

(21) Appl. No.: 16/874,013

(22) Filed: May 14, 2020

(65) Prior Publication Data

US 2021/0357442 A1 Nov. 18, 2021

(51) Int. Cl.
| | |
|---|---|
| *G06F 16/21* | (2019.01) |
| *G06F 16/383* | (2019.01) |
| *G06F 16/33* | (2019.01) |
| *G06F 40/284* | (2020.01) |
| *G06F 18/22* | (2023.01) |

(52) U.S. Cl.
CPC ........ *G06F 16/212* (2019.01); *G06F 16/3346* (2019.01); *G06F 16/383* (2019.01); *G06F 18/22* (2023.01); *G06F 40/284* (2020.01)

(58) Field of Classification Search
None
See application file for complete search history.

(56) References Cited

U.S. PATENT DOCUMENTS

| | | | |
|---|---|---|---|
| 8,386,401 | B2 | 2/2013 | Virkar et al. |
| 10,176,427 | B2 | 1/2019 | Dubey et al. |
| 10,318,882 | B2 | 6/2019 | Brueckner et al. |
| 11,080,605 | B1 * | 8/2021 | Yarbrough ............ H04L 67/535 |
| 2014/0052688 | A1 | 2/2014 | Bansal |
| 2016/0132787 | A1 | 5/2016 | Drevo et al. |

(Continued)

OTHER PUBLICATIONS

Bourennani, Farid. "Integration Of Heterogeneous Data Types Using Self Organizing Maps," Thesis Presented to the University of Ontario Institute of Technology, Jul. 1, 2009, pp. 1-77, Ontario, Canada, XP055828512, ISBN: 978-0-494-54251-4.

(Continued)

*Primary Examiner* — Thu N Nguyen
(74) *Attorney, Agent, or Firm* — Alston & Bird LLP

(57) ABSTRACT

There is a need for more effective and efficient cross-dataset field integration. In one example, a method comprises determining a primary integration feature vector for a primary dataset field; for each secondary dataset field of a plurality of secondary dataset fields, determining a secondary integration feature vector; determining, based at least in part on the primary integration feature vector and each secondary integration feature vector, an integration space; determining, for each secondary dataset field of the plurality of secondary dataset fields and based at least in part on the integration space, a distance measure between the primary dataset field and the secondary dataset field; determining, based at least in part on each distance measure between the primary dataset field and a secondary dataset field of the plurality of secondary dataset fields, a predefined number of the plurality of secondary dataset fields; and performing the cross-dataset field integration based at least in part on the a predefined number of the plurality of secondary dataset fields.

20 Claims, 12 Drawing Sheets

(56) References Cited

U.S. PATENT DOCUMENTS

| | | |
|---|---|---|
| 2017/0235735 A1 | 8/2017 | Ignatyev et al. |
| 2017/0308613 A1 | 10/2017 | Zhu et al. |
| 2018/0018353 A1 | 1/2018 | Morrison et al. |
| 2018/0246943 A1 | 8/2018 | Avagyan et al. |

OTHER PUBLICATIONS

International Searching Authority, International Search Report and Written Opinion for International Application No. PCT/US2021/031862, dated Aug. 9, 2021, (19 pages), European Patent Office, Rijswijk, Netherlands.

Karasneh, Yaser et al. "An Approach For Matching Schemas Of Heterogeneous Relational Databases," Journal of Digital Information Management, Aug. 1, 2010, pp. 260-269, XP055828985.

Ying, Qian et al. "Discovering Complex Matches Between Database Schemas," Proceedings of the 27th Chinese Control Conference, Jul. 16, 2008, pp. 663-667, Kunming, Yunnan, China, XP031310914, ISBN: 978-7-900719-70-6.

Anonymous, "Schema Matching Using Machine Learning," (7 pages). [Retrieved from the Internet Aug. 11, 2020] <URL: https://pdfs.semanticscholar.org/0786/c8586bc4f3491a394b07975b7d7780a1ce3a.pdf>.

Berlin, Jacob et al. "Database Schema Matching Using Machine Learning With Feature Selection," In International Conference On Advanced Information Systems Engineering, May 27, 2002, pp. 452-466. Springer-Verlag, Berlin, Heidelberg. [Retrieved from the Internet Aug. 11, 2020] <URL: https://link.springer.com/content/pdf/10.1007%2F3-540-47961-9_32.pdf>.

Doan, AnHai et al. "Reconciling Schemas Of Disparate Data Sources: A Machine-Learning Approach," In Proceedings of the 2001 ACM SIGMOD International Conference On Management of Data, May 1, 2001, pp. 509-520. [Retrieved from the Internet Aug. 11, 2020] <URL: https://homes.cs.washington.edu/~pedrod/papers/sigmod01.pdf>.

\* cited by examiner

900

Field 1 of Dataset 1 should be matched with:

○ Field 20 of Dataset 2 with a confidence score of 90%

○ Field 34 of Dataset 2 with a confidence score of 80%

○ Field 40 of Dataset 2 with a confidence score of 90

PERFORMING CROSS-DATASET FIELD INTEGRATION

BACKGROUND

Various embodiments of the present invention address technical challenges related to performing cross-dataset management in multi-dataset systems. Various embodiments of the present invention address the shortcomings of existing multi-dataset systems and disclose various techniques for efficiently and reliably performing cross-dataset management.

BRIEF SUMMARY

In general, embodiments of the present invention provide methods, apparatus, systems, computing devices, computing entities, and/or the like for performing cross-dataset field integration. Certain embodiments utilize systems, methods, and computer program products that perform cross-dataset field integration using one or more of integration feature vectors, integration spaces, and integration user interfaces.

In accordance with one aspect, a method is provided. In one embodiment, the method comprises determining, based at least in part on one or more primary relative term frequencies for the primary dataset field, a primary integration feature vector for the primary dataset field; for each secondary dataset field of the plurality of secondary dataset fields, determining, based at least in part on one or more secondary relative term frequencies for the secondary dataset field, a secondary integration feature vector; determining, based at least in part on the primary integration feature vector and each secondary integration feature vector for each secondary dataset field of the plurality of secondary dataset fields, an integration space; for each secondary dataset field of the plurality of secondary dataset fields, determining, based at least in part on the integration space, a distance measure between the primary dataset field and the secondary dataset field; determining, based at least in part on each distance measure between the primary dataset field and a secondary dataset field of the plurality of secondary dataset fields, a predefined number of the plurality of secondary dataset fields for the primary dataset field; and performing, based at least in part on the a predefined number of the plurality of secondary dataset fields for the primary dataset field, the cross-dataset field integration.

In accordance with another aspect, a computer program product is provided. The computer program product may comprise at least one computer-readable storage medium having computer-readable program code portions stored therein, the computer-readable program code portions comprising executable portions configured to determine, based at least in part on one or more primary relative term frequencies for the primary dataset field, a primary integration feature vector for the primary dataset field; for each secondary dataset field of the plurality of secondary dataset fields, determine, based at least in part on one or more secondary relative term frequencies for the secondary dataset field, a secondary integration feature vector; determine, based at least in part on the primary integration feature vector and each secondary integration feature vector for each secondary dataset field of the plurality of secondary dataset fields, an integration space; for each secondary dataset field of the plurality of secondary dataset fields, determine, based at least in part on the integration space, a distance measure between the primary dataset field and the secondary dataset field; determine, based at least in part on each distance measure between the primary dataset field and a secondary dataset field of the plurality of secondary dataset fields, a predefined number of the plurality of secondary dataset fields for the primary dataset field; and perform, based at least in part on the a predefined number of the plurality of secondary dataset fields for the primary dataset field, the cross-dataset field integration.

In accordance with yet another aspect, an apparatus comprising at least one processor and at least one memory including computer program code is provided. In one embodiment, the at least one memory and the computer program code may be configured to, with the processor, cause the apparatus to determine, based at least in part on one or more primary relative term frequencies for the primary dataset field, a primary integration feature vector for the primary dataset field; for each secondary dataset field of the plurality of secondary dataset fields, determine, based at least in part on one or more secondary relative term frequencies for the secondary dataset field, a secondary integration feature vector; determine, based at least in part on the primary integration feature vector and each secondary integration feature vector for each secondary dataset field of the plurality of secondary dataset fields, an integration space; for each secondary dataset field of the plurality of secondary dataset fields, determine, based at least in part on the integration space, a distance measure between the primary dataset field and the secondary dataset field; determine, based at least in part on each distance measure between the primary dataset field and a secondary dataset field of the plurality of secondary dataset fields, a predefined number of the plurality of secondary dataset fields for the primary dataset field; and perform, based at least in part on the a predefined number of the plurality of secondary dataset fields for the primary dataset field, the cross-dataset field integration.

BRIEF DESCRIPTION OF THE DRAWINGS

Figure 1:
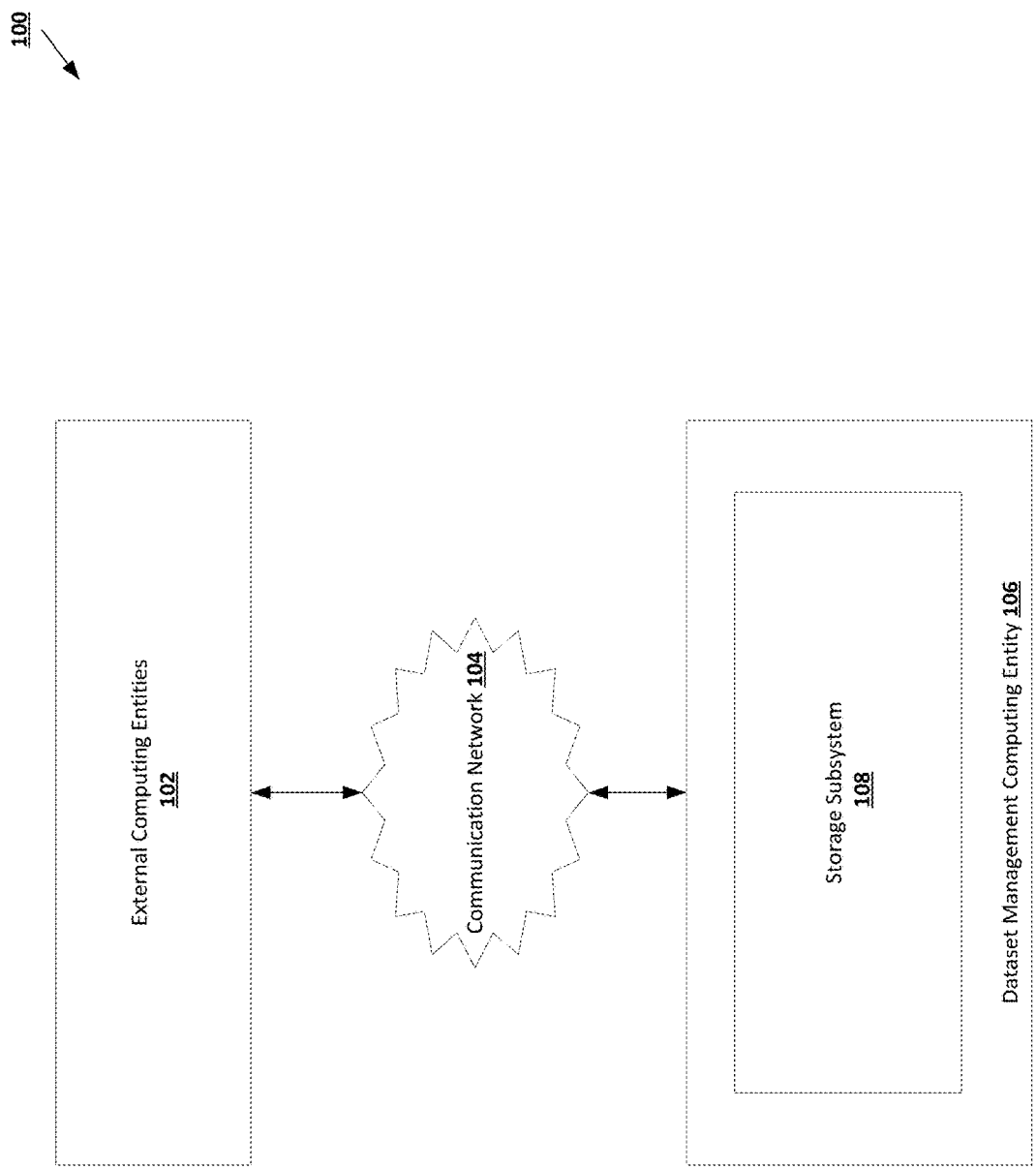

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
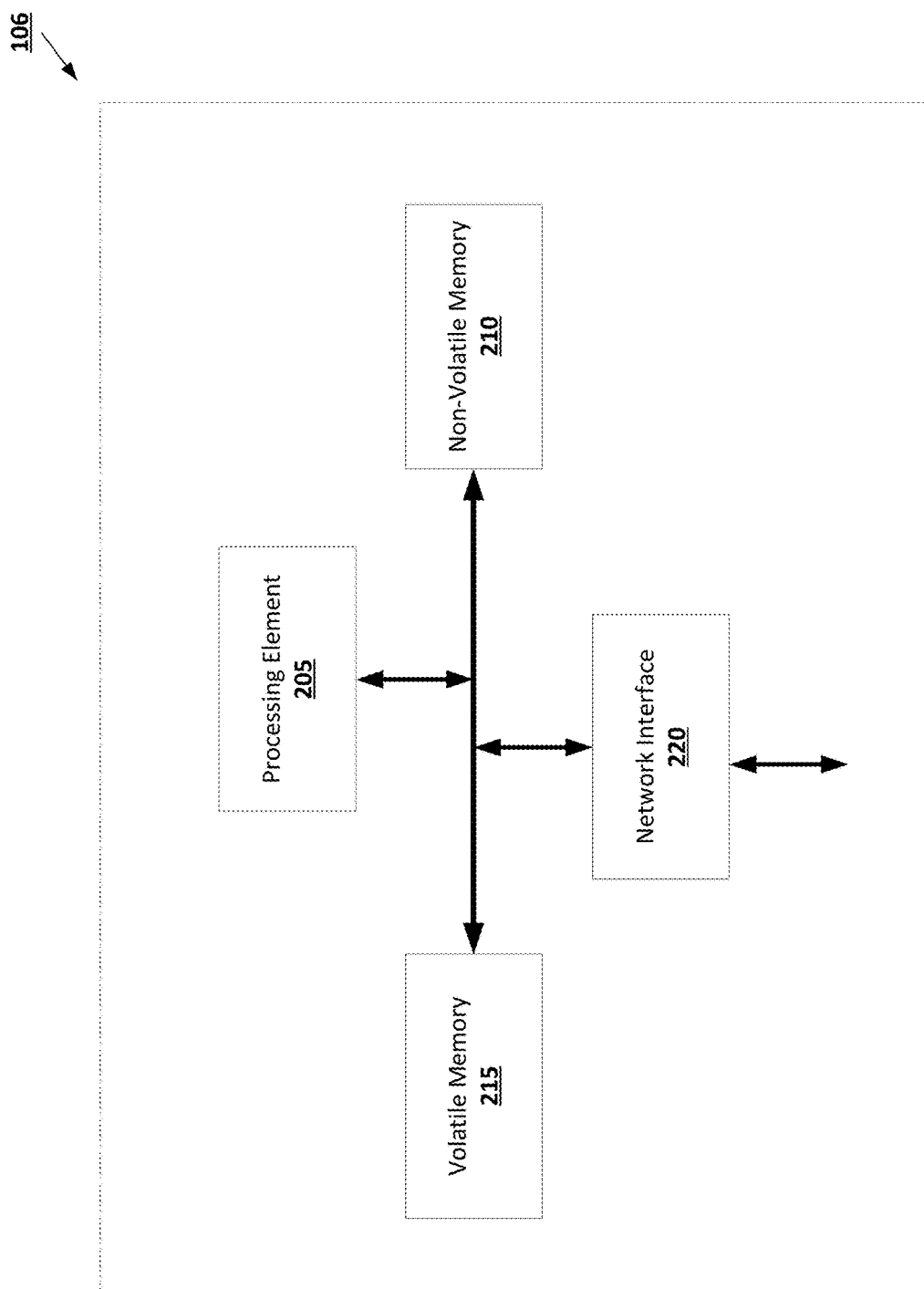

FIG. 2 provides an example dataset management computing entity in accordance with some embodiments discussed herein.

Figure 3:
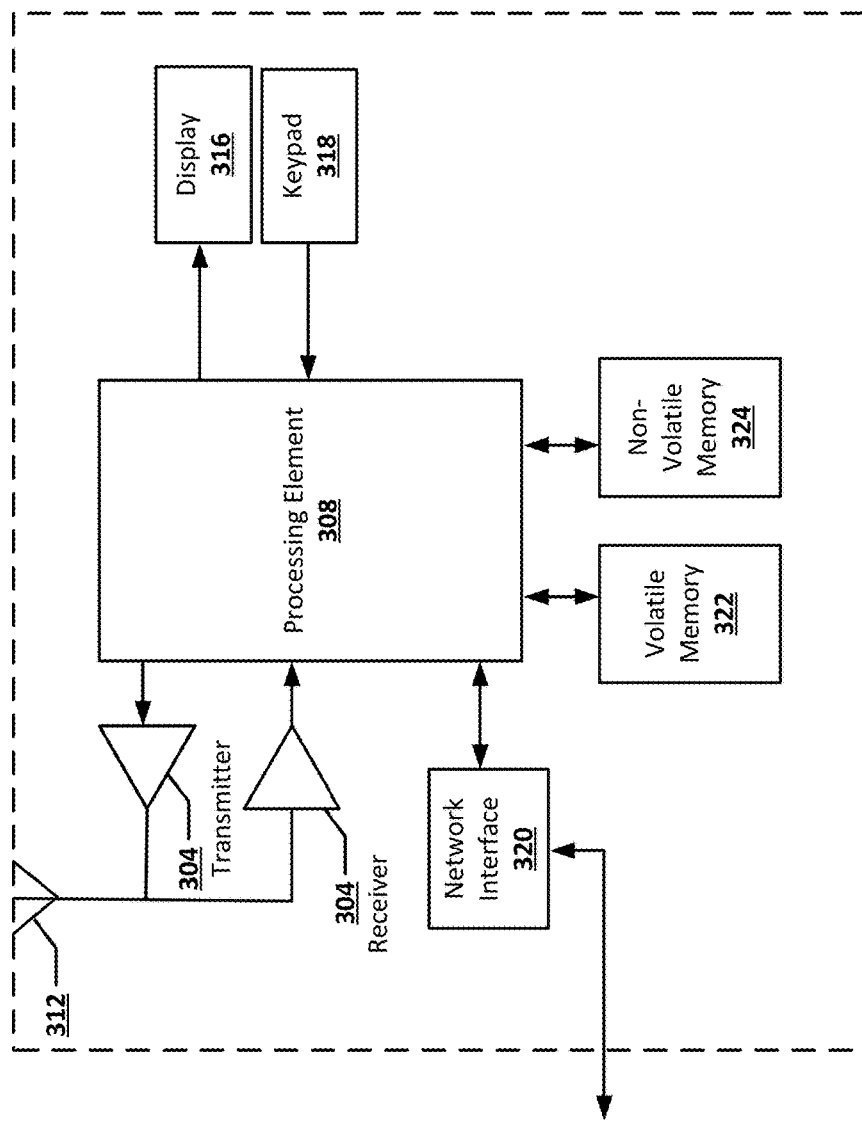

FIG. 3 provides an example external computing entity in accordance with some embodiments discussed herein.

Figure 4:
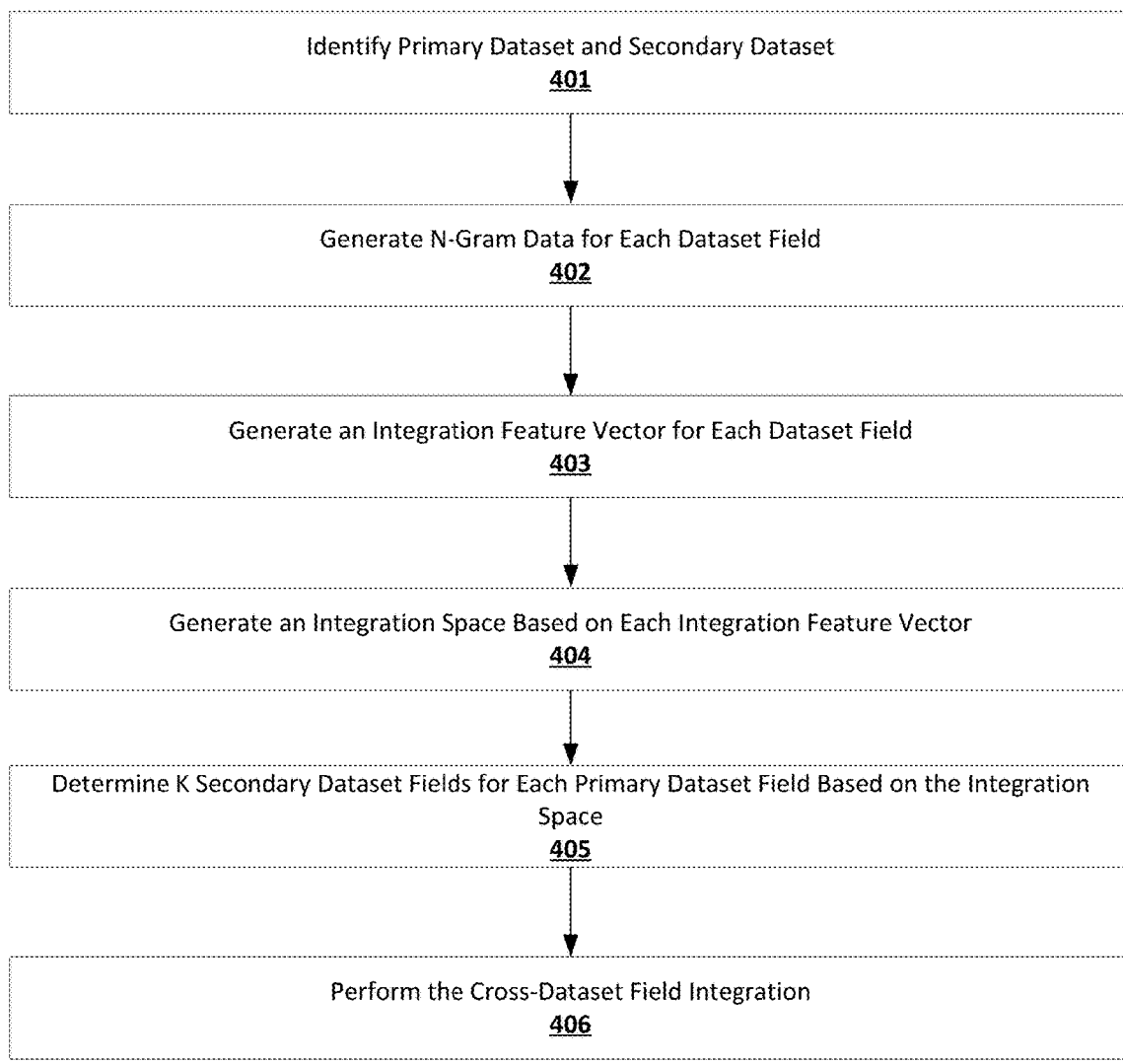

FIG. 4 is a flowchart diagram of an example process for performing cross-dataset field integration in accordance with some embodiments discussed herein.

Figure 5:
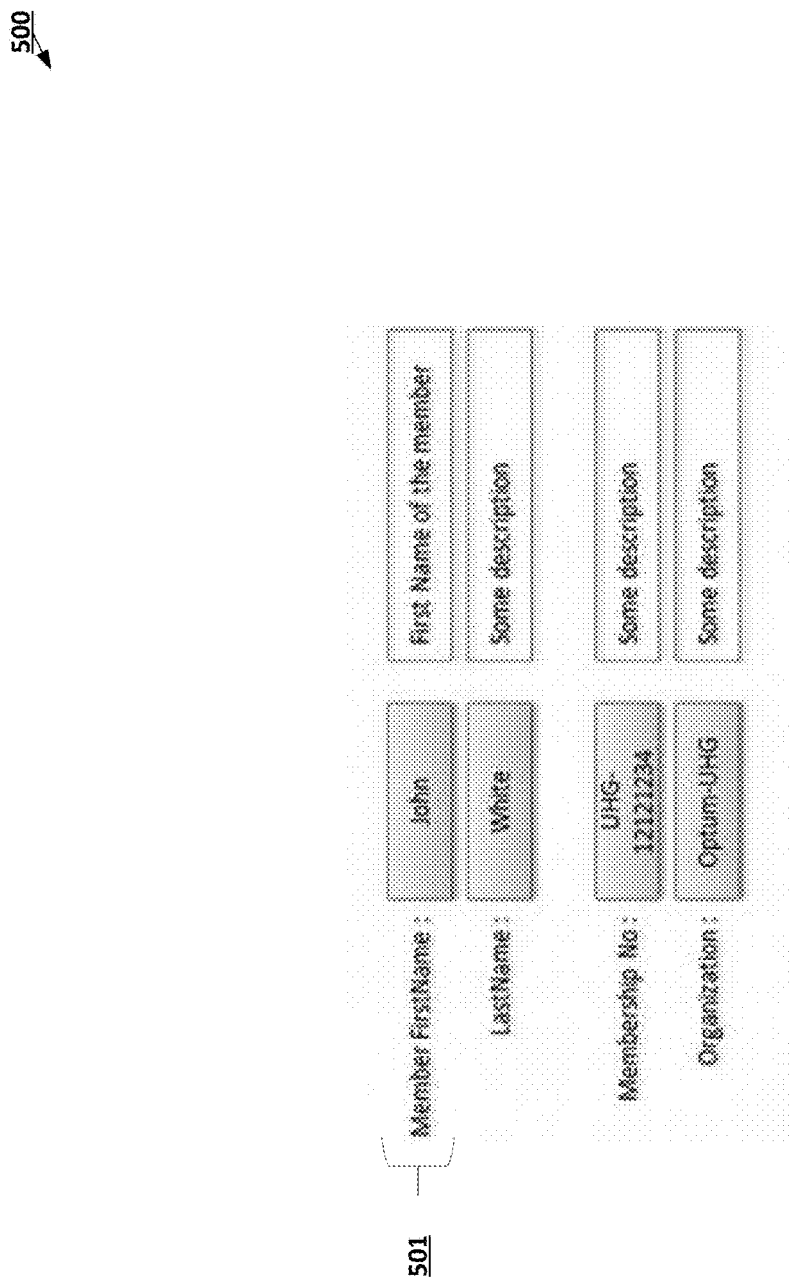

FIG. 5 provides an operational examples of a primary dataset in accordance with some embodiments discussed herein.

Figure 6:
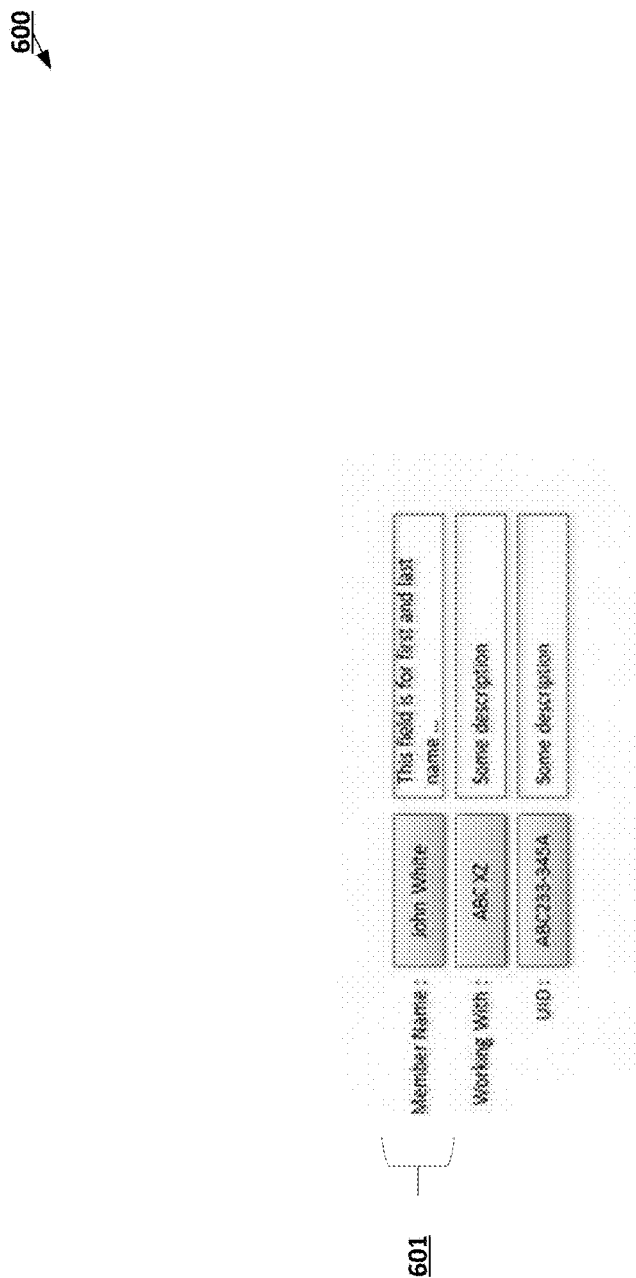

FIG. 6 provides an operational examples of a secondary dataset in accordance with some embodiments discussed herein.

Figure 7:
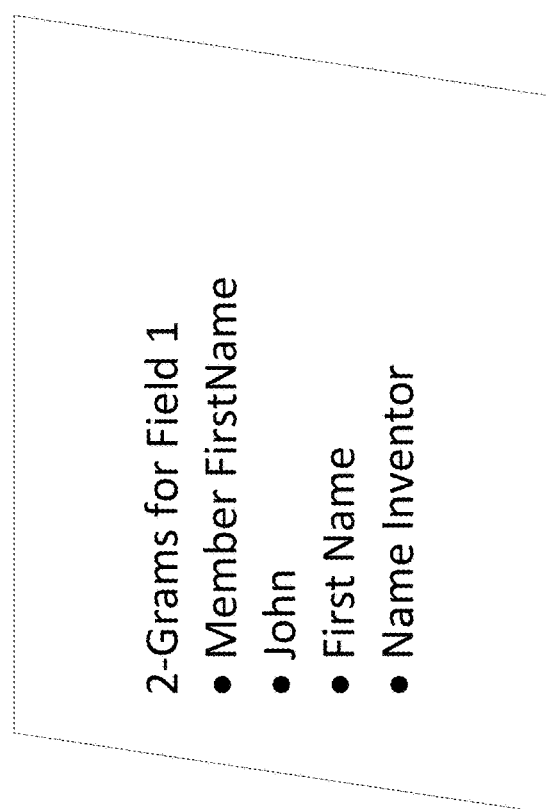

FIG. 7 provides an operational examples of n-gram data for a dataset field in accordance with some embodiments discussed herein.

Figure 8:
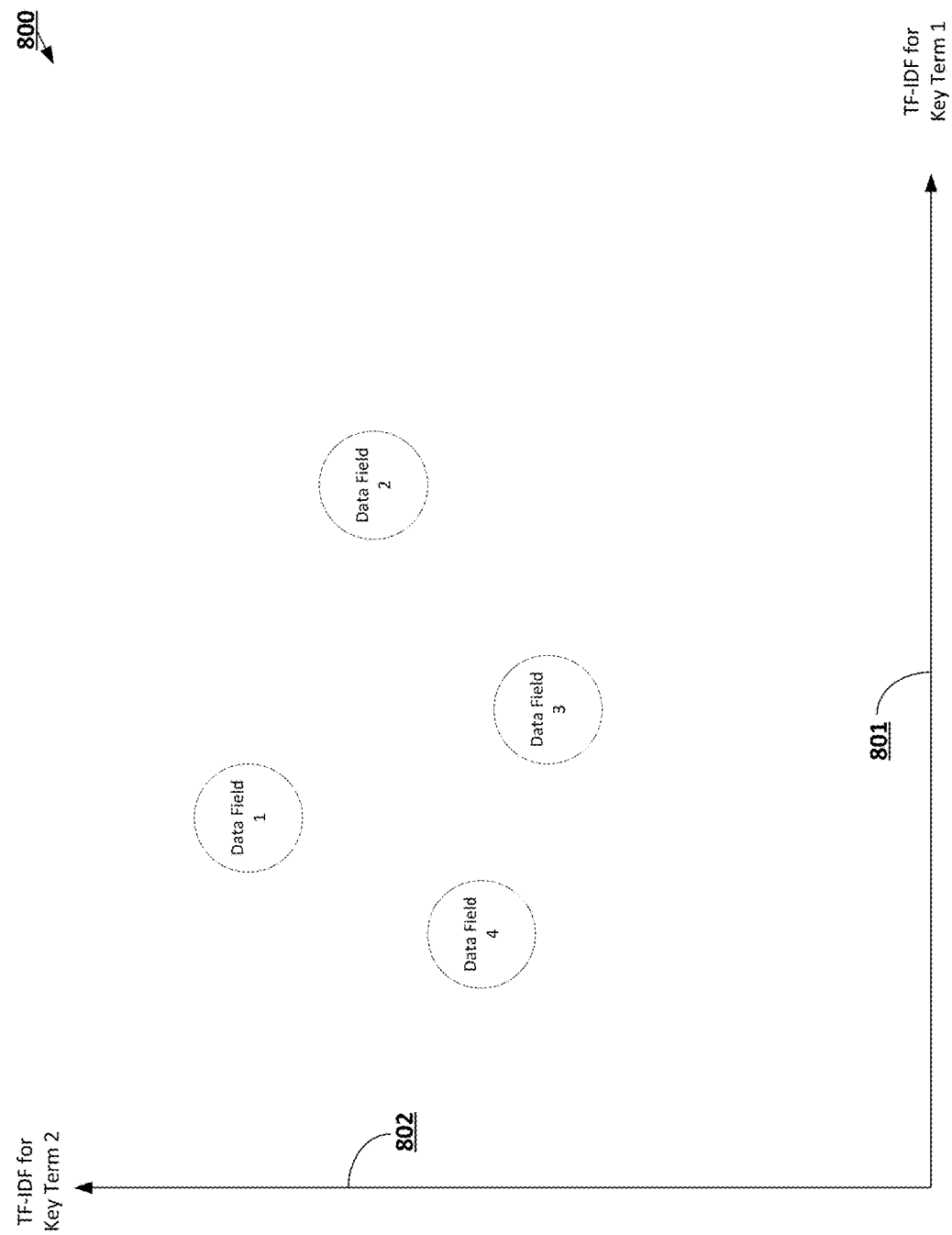

FIG. 8 provides an operational examples of an integration space in accordance with some embodiments discussed herein.

FIG. 9 provides an operational examples of an integration user interface in accordance with some embodiments discussed herein.

Figure 10:
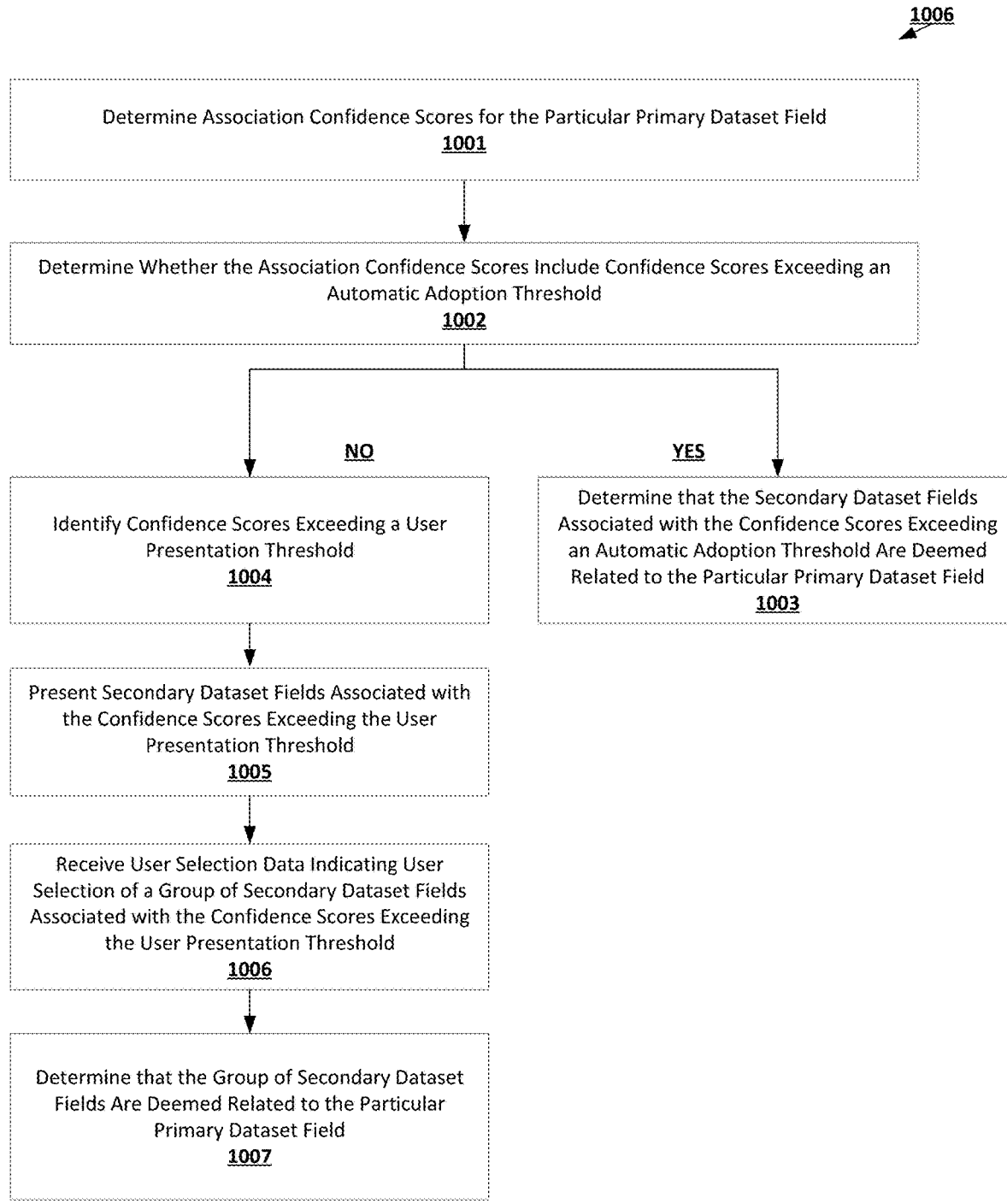

FIG. 10 is a flowchart diagram of an example process for performing a cross-dataset field integration for a particular primary dataset field in accordance with some embodiments discussed herein.

Figure 11:
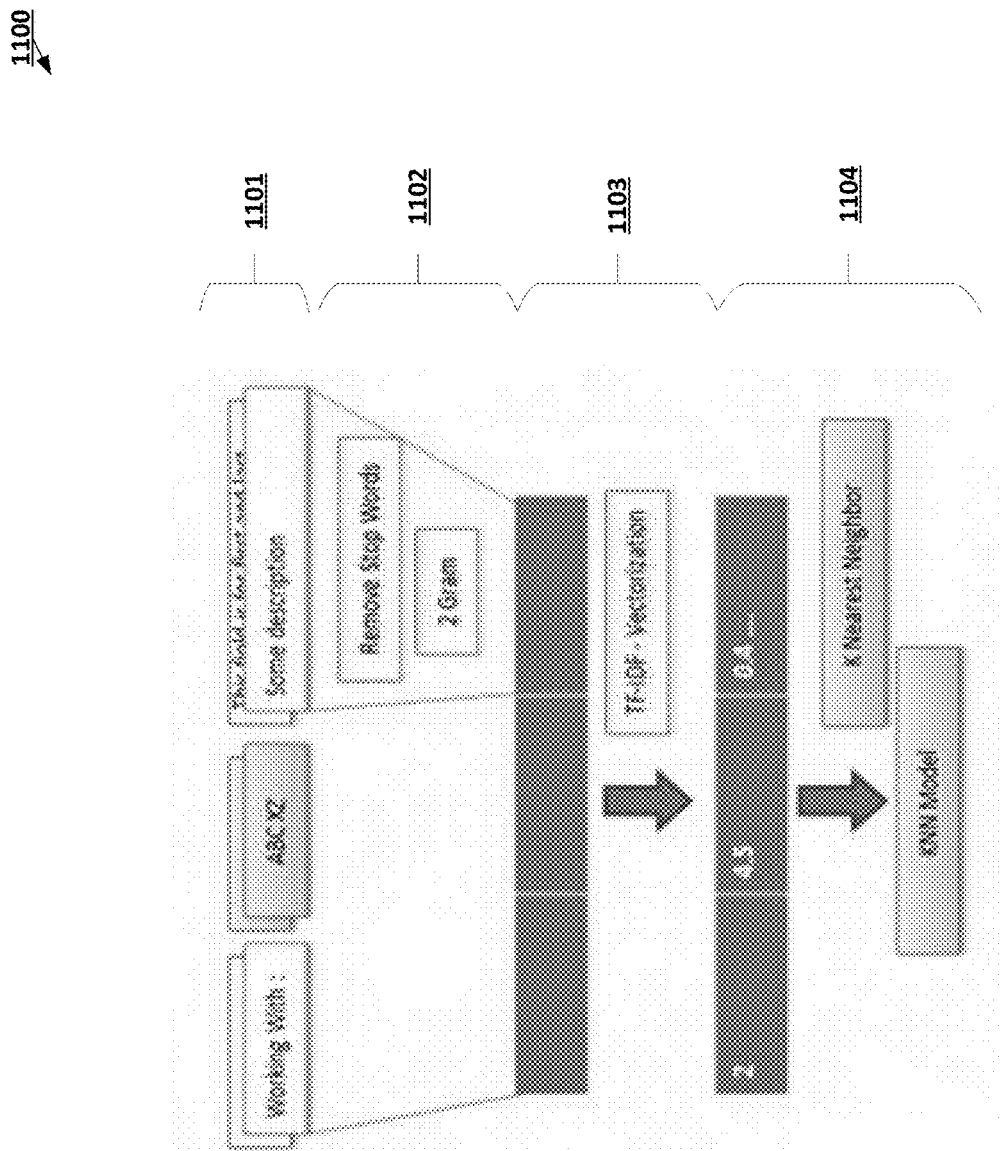

FIG. 11 provides an operational example of an unsupervised confidence score generation process in accordance with some embodiments discussed herein.

Figure 12:
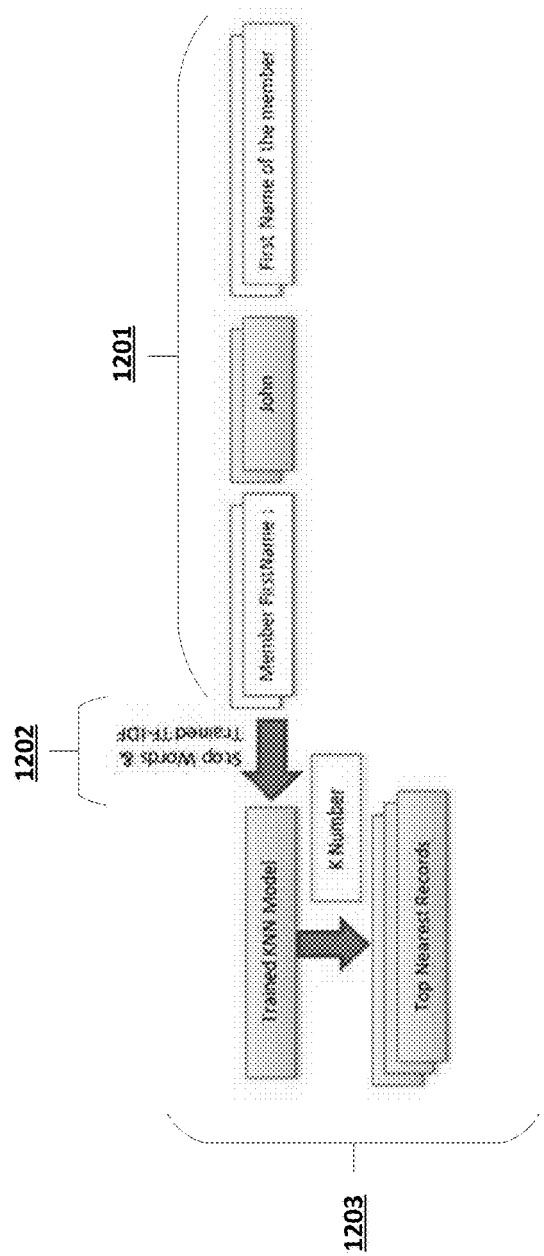

FIG. 12 provides an operational example of an unsupervised relevant secondary field detection process in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview

Various embodiments of the present invention address technical challenges related to performing cross-dataset integration in an effective and efficient manner. Various existing dataset management frameworks suffer from significant shortcomings when it comes to performing cross-dataset integration because they are unable to automatically and effectively identify associations between dataset fields in different dataset. For example, consider the problem of associating a field designated as "FirstName LastName" with two fields designated as "F Name" and "L Name" respectively. Absent efficient and effective cross-dataset integration solutions, such identification of field relationships that need to be performed in order to facilitate dataset integration has to be performed largely manually. Unfortunately, the state of the art indeed does require cross-dataset integrations to be performed largely manually because of absence of effective predictive models to detect associations between dataset fields.

To address the noted problems, various embodiments of the present invention develop models for detecting associations between diverse dataset fields that utilize effective and efficient feature extraction and predictive inference routines. For example, to perform feature extraction, various embodiments of the present invention utilize enhanced term-frequency-based approaches such as utilizing term-frequency-inverse-document-frequency (TF-IDF) values determined based at least in part on pre-processed and tokenized input data. Experimental results have shown operational superiority of such term-frequency-based feature extraction approaches to existing feature extraction approaches. Moreover, to perform predictive inference in order to detect associations between diverse dataset fields, various embodiments of the present invention utilize unsupervised model (e.g., the k-nearest-neighbor (kNN) model) that do not need target output data and accordingly can be used in domains where training data is scarce.

II. Exemplary Definitions

The term "cross-dataset field integration" may refer to a computer-implemented process configured to detect at least one association between sets of dataset fields of two or more datasets. For example, a cross-dataset field integration routine may be configured to detect an association between a particular field of a primary dataset and one or more secondary fields of a secondary dataset. In some embodiments, a cross-dataset field integration field may be utilized to associate a secondary dataset into a primary dataset. In some embodiments, the cross-dataset field integration may automatically perform a dataset association between two or more processes. In some other embodiments, the cross-dataset field integration may provide its recommended associations between diverse dataset fields to an administrator user profile in order to seek final resolution of the associations from the administrator user profile. In some embodiments, the cross-dataset field integration may be configured to: (i) determine a confidence score for a particular association between a first set of dataset fields and a second set of dataset fields; (ii) in response to the confidence score exceeding a threshold (e.g., a 98% confidence threshold), automatically adopt the particular association as an acceptable association; (iii) in response to the confidence score for the particular association not exceeding the threshold: (a) if another association for the first set of dataset fields exceeds the threshold, adopt the other association as the acceptable association, and (b) if no association for the first set of dataset fields exceeds the threshold, include the particular association as part of recommended associations to an administrator user profile if the confidence score for the particular association exceeds a second threshold (e.g., a 50% confidence threshold).

The term "dataset field" may refer to a designator of a group of attribute data items deemed to have the same type in a dataset, where an attribute data item may be any data item that describes one or more properties of one or more entities modeled by a dataset. For example, in a relational dataset including one or more relational tables, a dataset field may correspond to each column of a relational table, where each row of the relational table may correspond to an entity modeled by the relational table. As another example, in a graph-based dataset, a dataset field may correspond to any data object that has a secondary level relationship with one and only one node data object (as opposed to primary level relationships between node data objects), where a node data object may correspond to an entity modeled by the graph-based dataset. As a further example, in a static-schema dataset such as NoSQL, a dataset field may correspond to any data object defined by the static schema of the dataset.

The term "relative term frequency" may refer to any data object that indicates a frequency of one or more corresponding terms in a first document relative to the frequency of the one or more corresponding terms in one or more second documents, where a document may include any combination of textual data (e.g., any combination of natural language textual data), and where the second set of documents may be a document corpus that includes the first set of documents. For example, consider an exemplary circumstance in which the term "one" is used twenty times in a first document and fifteen times in a second document, while the term "disease" is used five times in a first document and once in the second document. In the noted example, while the term "one" is used more often than the term "disease" in the first document, the relative frequency of the usage of the term "disease" in the first document relative to a document corpus that includes the two documents may be higher than the relative frequency of the usage of the term "one" in the first document relative to the document corpus that includes the two documents. As the example illustrates, a relative term frequency may be associated with a term and a document corpus. The term associated with a relative term frequency may be defined by a vocabulary set including terms of interest whose occurrence is deemed relevant to performing feature extraction, while the document corpus associated with a relative term frequency may be defined by collections of input data for text processing, e.g., collections of input data for cross-dataset field integration.

The term "integration feature vector" may refer to a data object that includes one or more values associated with a document (e.g., a document that includes n-gram data for a field), where each of the one or more values of the integration feature vector indicates the relative term frequency of a corresponding term in the document. For example, when performing cross-dataset field integration, an integration feature vector may be associated with a document that includes n-gram data for a corresponding dataset field and may include relative term frequencies for each term in a vocabulary set associated with the cross-dataset field integration in the document that includes n-gram data for the corresponding dataset field. Integration feature vectors for dataset fields may be processed using a K Nearest Neighbor clustering algorithm to generate clusters of dataset fields.

The term "integration space" for a cross-dataset field integration routine may refer to a data object that defines: (i) one or more dimensions each associated with a term in a vocabulary set associated with the cross-dataset field integration routine and/or each associated with a field of an integration feature vector format associated with the cross-dataset field integration routine, and (ii) a space location for each dataset field associated with the cross-dataset field integration routine in accordance with the one or more dimensions. The integration space may be utilized to perform cross-dataset field integration routine by using an unsupervised machine learning routine that does not require using target output data. In doing so, utilizing an integration space decreases training costs associated with performing cross-dataset field integration by using machine learning. Moreover, using an integration space enables defining and utilizing cross-dataset field integration models that have greater applicability across datasets of different purposes, structures, and data formats.

The term "n-gram data" for a dataset field may refer to a data object that includes n-grams generated based on at least some of the words used in designated metadata associated with the dataset field. Thus, the n-gram data for a dataset field may be defined by the following parameters: (i) n-gram size (e.g., a size of two in order to capture 2-grams), (ii) metadata designations for metadata used to generate n-gram data, and (iii) the type of words in each metadata unit used to generate n-grams. For example, the n-gram data for a dataset field may be determined based on extracting 2-grams from non-stop-word words in at least one of the field name, field description, and sample field value of a dataset field. In some embodiments, given a dataset field associated with the field name "Member FirstName", sample field value "John", and description data "First Name of the Inventor", the following n-gram data may be generated for the dataset field: "Member FirstName", "John", "First Name", "Name Inventor".

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a dataset query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing cross-dataset field integration. The architecture 100 includes a dataset management computing entity 106 configured to identify associations between dataset fields of two or more datasets as well as one or more external computing entities 102 configured to provide dataset data to the dataset management computing entity 106 as well as provide request for cross-dataset field integration to the dataset management computing entity 106. Upon receiving dataset data from an external computing entity 102, the dataset management computing entity 106 may store such data in its storage subsystem 108 and utilize the stored data in performing cross-dataset field integrations. Upon receiving a cross-dataset field integration request, the dataset management computing entity 106 may perform the cross-dataset field integration requested by the cross-dataset field integration and provide integration data (e.g., information about cross-dataset field associations and/or information about a resulting merged dataset) to the requesting external computing entity 102.

In some embodiments, the dataset management computing entity 106 may communicate with at least one of the external computing entities 102 using one or more communication networks, such as the communication network 104. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The dataset management computing entity 106 includes the storage subsystem 108. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Dataset Management Computing Entity

FIG. 2 provides a schematic of a dataset management computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the dataset management computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the dataset management computing entity 106 may include or be in communication with one or more processing elements 205 (also referred to as processors, processing circuitry, and/or similar terms used herein interchangeably) that communicate with other elements within the dataset management computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the dataset management computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store datasets, dataset instances, dataset management systems, data, applications, programs, program modules, scripts, source code, object code, byte code, compiled code, interpreted code, machine code, executable instructions, and/or the like. The term dataset, dataset instance, dataset management system, and/or similar terms used herein interchangeably may refer to a collection of records or data that is stored in a computer-readable storage medium using one or more dataset models, such as a hierarchical dataset model, network model, relational model, entity—relationship model, object model, document model, semantic model, graph model, and/or the like.

In one embodiment, the dataset management computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the datasets, dataset instances, dataset management systems, data, applications, programs, program modules, scripts, source code, object code, byte code, compiled code, interpreted code, machine code, executable instructions, and/or the like being executed by, for example, the processing element 205. Thus, the datasets, dataset instances, dataset management systems, data, applications, programs, program modules, scripts, source code, object code, byte code, compiled code, interpreted code, machine code, executable instructions, and/or the like may be used to control certain aspects of the operation of the dataset management computing entity 106 with the assistance of the processing element 205 and operating system.

As indicated, in one embodiment, the dataset management computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the dataset management computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the dataset management computing entity 106 may include or be in communication with one or more input elements, such as a keyboard input, a mouse input, a touch screen/display input, motion input, movement input, audio input, pointing device input, joystick input, keypad input, and/or the like. The dataset management computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the dataset management computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the dataset management computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the dataset management computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store datasets, dataset instances, dataset management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the dataset management computing entity 106 and/or various other computing entities.

In another embodiment, the external computing entity 102 may include one or more components or functionality that are the same or similar to those of the dataset management computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

To address problems associated with efficiency and effectiveness of cross-dataset integration, various embodiments of the present invention develop models for detecting associations between diverse dataset fields that utilize effective and efficient feature extraction and predictive inference routines. For example, to perform feature extraction, various embodiments of the present invention utilize enhanced term-frequency-based approaches such as utilizing term-frequency-inverse-domain-frequency (TF-IDF) values determined based at least in part on pre-processed and tokenized input data. Experimental results have shown operational superiority of such term-frequency-based feature extraction approaches to existing feature extraction approaches. Moreover, to perform predictive inference in order to detect associations between diverse dataset fields, various embodiments of the present invention utilize unsupervised model (e.g., the k-nearest-neighbor (kNN) model) that do not need target output data and as such can be used flexibly and universally on any dataset regardless of whether the model has been trained on the dataset specifically.

By utilizing the noted approaches, various embodiments of the present invention enhance effectiveness and efficiency of performing cross-dataset integration by introducing techniques for detecting associations between dataset fields of various datasets. In doing so, various embodiments of the present invention enhance efficiency and effectiveness of existing multi-dataset management solutions and make important technical contributions to improving efficiency and effectiveness of existing multi-dataset management solutions. Aspects of the noted innovative aspects of the present invention are described below. While various embodiments of the present invention are described with reference to integrating two datasets, a person of ordinary skill in the relevant technology will recognize that any number of datasets (e.g., three or more datasets) may be integrated.

FIG. 4 is a flowchart diagram of an example process 400 for performing cross-dataset field integration. Via the various steps/operations of the process 400, the dataset management computing entity can perform cross-dataset field integration in an effective and efficient manner by integrating information about relative term frequencies in the metadata associated with dataset fields. In some embodiments, a dataset is any collection of data fields, such as a collection of data fields associated with one or more database tables. An example of a dataset is a relational data table.

The process 400 begins at step/operation 401 when the dataset management computing entity 106 identifies a primary dataset and a secondary dataset. In some embodiments, the dataset management computing entity 106 retrieves the primary dataset and the secondary dataset from the storage subsystem 108. In some embodiments, the dataset management computing entity 106 receives the primary dataset and the secondary dataset from an external computing entity 102. In some embodiments, the dataset management computing entity 106 receives the primary dataset and the secondary dataset from an external computing entity 102, stores the received primary dataset and secondary dataset in the storage subsystem 108, and retrieves the stored primary dataset and secondary dataset from the storage subsystem 108.

In some embodiments, each of the primary dataset and the secondary dataset includes one or more dataset fields, referred to herein as primary dataset fields for the primary dataset and secondary dataset fields for the secondary dataset. In some embodiments, each dataset field is associated with at least one of a field name, sample field value data configured to indicate an expected format of the dataset field, and description metadata configured to describe a natural language description of a function and/or purpose of the dataset field. For example, the primary dataset field 501 in the example primary dataset 500 of FIG. 5 is associated with the field name "Member FirstName", the sample field value data "John:, and the description metadata "First Name of the Inventor". As another example, the secondary dataset field 601 in the exemplary secondary dataset 600 of FIG. 6 is associated with the field name "Member Name", sample data "John White", and description metadata "This field is for first name and last name".

At step/operation 402, the dataset management computing entity 106 generates n-gram data for each dataset field in the primary dataset or the secondary dataset. In some embodiments, to generate n-gram data for a dataset field, the dataset management computing entity 106 first identifies integration data for the dataset field (e.g., at least one of the field name for the dataset field, sample field value data for the dataset field, and description metadata for the dataset field). Thereafter, the dataset management computing entity 106 may perform pre-processing on the integration data for each dataset field to generate preprocessed integration data for the dataset field. For example, the dataset management computing entity 106 may remove common words and/or stop words from the integration data to generate preprocessed integration data. As another example, the dataset management computing entity 106 may add synonym data for at least some of the terms associated with the integration data to generate preprocessed integration data.

After generating the preprocessed integration data for each dataset field, the dataset management computing entity 106 may generate n-grams (e.g., 2-grams) from the preprocessed integration data by identifying all potential n-grams in the preprocessed integration data based at least in part on a sequence of the terms used in the preprocessed integration data. For example, given the primary dataset field 501 of the primary dataset 500 depicted in FIG. 5, the dataset management computing entity 106 may first determine the preprocessed integration data "Member FirstName, John, First Name Inventor". Afterward, the dataset management computing entity 106 may generate the example n-gram data 700 depicted in FIG. 7 for the primary dataset field 501. As depicted in FIG. 7, the n-gram data 700 includes the following n-grams: "Member FirstName", "John", "First Name", "Name Inventor".

Returning to FIG. 4, at step/operation 403, the dataset management computing entity 106 generates an integration feature vector for each dataset field based at least in part on one or more relative term frequencies for the dataset field. In some embodiments, to generate the relative term frequencies for a dataset field, the dataset management computing entity 106 generates TF-IDF measures for one or more key terms in the n-gram data associated with the dataset field.

In some embodiments, to generate the TF-IDF for a key term in the n-gram data associated with a dataset field, the dataset management computing entity 106 determines a ratio of a measure of frequency of the key term in the n-gram data for the dataset field and a measure of frequency pf the key term in the n-gram data for other dataset fields. While various embodiments of the present invention are described with respect to TF-IDF measures determined using a TF-IDF algorithm, a person of ordinary skill in the relevant technology will recognize that any algorithm for determining absolute frequencies and/or relative frequencies of terms within a corpus may be utilized. In some embodiments, the dataset management computing entity 106 combines each relative term frequency for a dataset field to generate the integration feature vector for the dataset field.

At step/operation 404, the dataset management computing entity 106 generates an integration space for the dataset fields based at least in part on each integration feature vector for a dataset field. In some embodiments, the integration space comprises one or more dimensions, where each dimension of the one or more dimensions corresponds to a key term of one or more key terms and each relative term frequency corresponds to a key term of the one or more key terms. An operational example of a two-dimensional integration space 800 is depicted in FIG. 8. As depicted in FIG. 8, the two-dimensional integration space 800 has a first dimension 801 that corresponds to TF-IDF values for a first key term and a second dimension 802 that corresponds to TF-IDF values for a second key term.

At step/operation 405, the dataset management computing entity 106 determines, for each primary dataset field, a predefined number (e.g., K) of the secondary dataset fields as well as a confidence measure for association of the primary dataset field with each of the secondary dataset fields. In some embodiments, the value of K may be a hyper-parameter of a cross-dataset field integration model that may be set by one or more administrator user profiles and/or may be set based at least in part on one or more trained hyper-parameter generation modules. In some embodiments, to determine the K secondary dataset fields associated with a primary dataset field, the dataset management computing entity 106 determines a distance measure between the primary dataset field and each secondary dataset field in the integration space and selects the K secondary dataset fields having the lowest distance measures.

In some embodiments, determining the distance measures between dataset fields and/or determining the K secondary dataset fields for each primary dataset field is performed using kNN. In some embodiments, the confidence measure for associating a primary dataset field and a secondary dataset field is determined based at least in part on the distance measure between the two dataset fields (e.g., such that the lower the distance measure between two dataset fields, the higher the confidence measure for associating the two dataset fields).

At step/operation 406, the dataset management computing entity 106 performs the cross-dataset field integration based at least in part on the dataset associations and the confidence measures determined in step/operation 406. In some embodiments, performing the cross-dataset field integration comprises automatically migrating data associated with the secondary dataset to the primary dataset based at least in part on the dataset associations and the confidence measures determined in step/operation 406. In some embodiments, performing the cross-dataset field integration comprises displaying an integration user interface that includes indications of at least some of the dataset associations and/or the confidence measures determined in step/operation 406.

An operational example of an integration user interface 900 is depicted in FIG. 9. As depicted in FIG. 9, the integration user interface 900 depicts top K matched secondary dataset fields for a primary dataset field along with the confidence scores for matching those secondary dataset fields with the primary dataset fields. The integration user interface 900 further enables an administrator user profile (e.g., a subject matter expert administrator user profile) to select one or more of the K matched secondary dataset for matching with the primary dataset field.

In some embodiments, step/operation 406 may be performed in accordance with the process depicted in FIG. 10. The process depicted in FIG. 10 begins at step/operation 1001 when the dataset management computing entity 106 determines one or more association confidence scores for a particular primary dataset field, where each association confidence score indicates an estimated relevance of the particular primary dataset field with a secondary dataset field of the plurality of secondary dataset fields. In some embodiments, to determine the plurality of association confidence scores for example primary dataset field 1101, the dataset management computing entity 106 performs the text preprocessing operations 1102, the TF-IDF vectorization operations 1103, and the KNN analysis 1104 depicted in the unsupervised confidence score generation process 1100 of FIG. 11.

In some embodiments, the dataset management computing entity 106 determines association confidence scores for the particular primary dataset field with respect to only a relevant subset of the plurality of secondary dataset field. In some of those embodiments, to detect the relevant subset of the plurality of secondary confidence scores for example primary dataset field 1201, the dataset management computing entity 106 performs feature extraction operations 1202 and KNN analysis operations 1203 depicted in the unsupervised relevant secondary field detection process of FIG. 12.

Returning to FIG. 10, at step/operation 1002, the dataset management computing entity 106 determines whether the association confidence scores include one or more confidence scores exceeding an automatic adoption threshold (e.g., a 90 percent automatic adoption threshold). In response to determining that the association confidence scores include one or more confidence scores exceeding the automatic adoption threshold, at step/operation 1003, the dataset management computing entity 106 determines that the secondary dataset fields that are associated with the one or more confidence scores exceeding the automatic adoption threshold are deemed related to the particular primary dataset field. Thus, in some embodiments, any secondary dataset field having a high enough confidence threshold may be automatically adopted as a related secondary dataset field associated with the particular primary dataset field.

In response to determining that the association confidence scores do not include one or more confidence scores exceeding the automatic adoption threshold, the dataset management computing entity 106 proceeds to: (i) at step/operation 1004, identify one or more confidence scores exceeding a user presentation threshold (e.g., a 50 percent user presentation threshold), (ii) at step/operation 1005, present the secondary dataset fields associated with one or more confidence scores exceeding the user presentation threshold to an administrator user profile using an integration user interface (e.g., the integration user interface 900 of FIG. 9), (iii) at step/operation 1006, receive user selection data indicating user selection of a group of the secondary dataset fields associated with the one or more confidence scores exceeding the user presentation threshold by the administrator user profile interacting with the integration user interface, and (iv) at step/operation 1007, determine that the group of the secondary dataset fields associated selected by the administrator user profile are deemed related to the particular primary dataset field.

In some embodiments, the administrator user profile is only allowed to select up to a maximum number of the secondary dataset fields associated with one or more confidence scores exceeding the user presentation threshold, where the maximum number may be determined based on a maximum number parameter associated with the particular primary dataset field, and where the maximum number parameter associated with the particular primary dataset field may be a statically-defined, dynamically-defined, or trained parameter. For example, if the particular primary dataset field is a first name dataset field, the maximum number parameter associated with the particular primary dataset field may allow for selecting up to one secondary dataset field associated with the particular primary dataset field. As another example, if the particular primary dataset field is a full name name dataset field, the maximum number parameter associated with the particular primary dataset field may allow for selecting up to three secondary dataset fields associated with the particular primary dataset field.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented for performing cross-dataset field integration between a primary dataset field of a primary dataset and a plurality of secondary dataset fields of a secondary dataset, the computer-implemented method comprising:

determining, by one or more processors and based at least in part on one or more primary relative term frequencies for the primary dataset field, a primary integration feature vector for the primary dataset field;

for each secondary dataset field of the plurality of secondary dataset fields, determining, by the one or more processors and based at least in part on one or more secondary relative term frequencies for the secondary dataset field, a secondary integration feature vector;

determining, by the one or more processors and based at least in part on the primary integration feature vector and each secondary integration feature vector, an integration space;

for each secondary dataset field, determining, based at least in part on the integration space, a distance measure between the primary dataset field and the secondary dataset field;

determining, by the one or more processors and based at least in part on each distance measure, a predefined number of the plurality of secondary dataset fields for the primary dataset field; and performing, by the one or more processors and based at least in part on the predefined number of the plurality of secondary dataset fields for the primary dataset field, the cross-dataset field integration.

2. The computer-implemented method of claim 1, wherein the one or more primary relative term frequencies for the primary dataset field are determined based at least in part on primary n-gram data extracted from at least one of a field name associated with the primary dataset field, sample field value data associated with the primary dataset field, or description metadata associated with the primary dataset field.

3. The computer-implemented method of claim 1, wherein the one or more secondary relative term frequencies for a secondary dataset field are determined based at least in part on secondary n-gram data extracted from at least one of a field name associated with the secondary dataset field, sample field value data associated with the secondary dataset field, or description metadata associated with the secondary dataset field.

4. The computer-implemented method of claim 1, wherein:

the integration space comprises one or more dimensions, each dimension of the integration space corresponds to a key term of one or more key terms, each primary relative term frequency of the one or more primary relative term frequencies is associated with a key term of the one or more key terms, and each secondary relative term frequency of the one or more secondary relative term frequencies for a secondary dataset field of the plurality of secondary dataset fields is associated with a key term of the one or more key terms.

5. The computer-implemented method of claim 1, wherein:

each primary relative term frequency of the one or more primary relative term frequencies is a term-frequency-inverse-domain-frequency (TF-IDF) measure, and each secondary relative term frequency of the one or more secondary relative term frequencies for a secondary dataset field of the plurality of secondary dataset fields.

6. The computer-implemented method of claim 1, wherein determining each distance measure between the primary dataset field and a secondary dataset field of the plurality of secondary dataset fields is performed based at least in part on a k-nearest-neighbor (kNN) routine.

7. The computer-implemented method of claim 1, further comprising determining, based at least in part on each distance measure, a confidence measure for each secondary dataset field in the predefined number of the plurality of secondary dataset fields for the primary dataset field.

8. The computer-implemented method of claim 7, wherein the cross-dataset field integration is further performed based at least in part on each confidence measure for a secondary dataset field in the predefined number of the plurality of secondary dataset fields for the primary dataset field.

9. The computer-implemented method of claim 1, wherein performing the cross-dataset field integration comprises migrating secondary data associated with the secondary dataset to the primary dataset.

10. The computer-implemented method of claim 1, wherein performing the cross-dataset field integration comprises displaying the predefined number of the plurality of secondary dataset fields for the primary dataset field via an integration user interface.

11. An apparatus for performing cross-dataset field integration between a primary dataset field of a primary dataset and a plurality of secondary dataset fields of a secondary dataset, the apparatus comprising one or more processors and at least one memory including program code, the at least one memory and the program code configured to, with the one or more processors, cause the apparatus to at least:
 determine, based at least in part on one or more primary relative term frequencies for the primary dataset field, a primary integration feature vector for the primary dataset field;
 for each secondary dataset field of the plurality of secondary dataset fields, determine, based at least in part on one or more secondary relative term frequencies for the secondary dataset field, a secondary integration feature vector;
 determine, based at least in part on the primary integration feature vector and each secondary integration feature vector, an integration space;
 for each secondary dataset field, determine, based at least in part on the integration space, a distance measure between the primary dataset field and the secondary dataset field;
 determine, based at least in part on each distance measure, a predefined number of the plurality of secondary dataset fields for the primary dataset field; and
 perform, based at least in part on the predefined number of the plurality of secondary dataset fields for the primary dataset field, the cross-dataset field integration.

12. The apparatus of claim 11, wherein the one or more primary relative term frequencies for the primary dataset field are determined based at least in part on primary n-gram data extracted from at least one of a field name associated with the primary dataset field, sample field value data associated with the primary dataset field, or description metadata associated with the primary dataset field.

13. The apparatus of claim 11, wherein the one or more secondary relative term frequencies for a secondary dataset field are determined based at least in part on secondary n-gram data extracted from at least one of a field name associated with the secondary dataset field, sample field value data associated with the secondary dataset field, or description metadata associated with the secondary dataset field.

14. The apparatus of claim 11, wherein:
 the integration space comprises one or more dimensions, each dimension of the integration space corresponds to a key term of one or more key terms,
 each primary relative term frequency of the one or more primary relative term frequencies is associated with a key term of the one or more key terms, and
 each secondary relative term frequency of the one or more secondary relative term frequencies for a secondary dataset field of the plurality of secondary dataset fields is associated with a key term of the one or more key terms.

15. The apparatus of claim 11, wherein:
 each primary relative term frequency of the one or more primary relative term frequencies is a term-frequency-inverse-domain-frequency (TF-IDF) measure, and
 each secondary relative term frequency of the one or more secondary relative term frequencies for a secondary dataset field of the plurality of secondary dataset fields.

16. The apparatus of claim 11, wherein determining each distance measure between the primary dataset field and a secondary dataset field of the plurality of secondary dataset fields is performed based at least in part on a k-nearest-neighbor (kNN) routine.

17. The apparatus of claim 11, wherein the at least one memory and the program code configured to, with the one or more processors, cause the apparatus to at least determine, based at least in part on each distance measure, a confidence measure for each secondary dataset field in the predefined number of the plurality of secondary dataset fields for the primary dataset field.

18. A computer program product for performing cross-dataset field integration between a primary dataset field of a primary dataset and a plurality of secondary dataset fields of a secondary dataset, the computer program product comprising at least one non-transitory computer-readable storage medium having computer-readable program code portions stored therein, the computer-readable program code portions configured to:
 determine, based at least in part on one or more primary relative term frequencies for the primary dataset field, a primary integration feature vector for the primary dataset field;
 for each secondary dataset field of the plurality of secondary dataset fields, determine, based at least in part on one or more secondary relative term frequencies for the secondary dataset field, a secondary integration feature vector;
 determine, based at least in part on the primary integration feature vector and each secondary integration feature vector, an integration space;
 for each secondary dataset field, determine, based at least in part on the integration space, a distance measure between the primary dataset field and the secondary dataset field;
 determine, based at least in part on each distance measure, a predefined number of the plurality of secondary dataset fields for the primary dataset field; and
 perform, based at least in part on the predefined number of the plurality of secondary dataset fields for the primary dataset field, the cross-dataset field integration.

19. The computer program product of claim 18, wherein the one or more primary relative term frequencies for the primary dataset field are determined based at least in part on primary n-gram data extracted from at least one of a field name associated with the primary dataset field, sample field value data associated with the primary dataset field, or description metadata associated with the primary dataset field.

20. The computer program product of claim 18, wherein the one or more secondary relative term frequencies for a secondary dataset field are determined based at least in part on secondary n-gram data extracted from at least one of a field name associated with the secondary dataset field, sample field value data associated with the secondary dataset field, or description metadata associated with the secondary dataset field.

* * * * *